June 15, 1965 J. E. ADAMS 3,189,076
SHEET METAL CAGE NUT
Filed May 22, 1962

INVENTOR.
JAMES E. ADAMS
BY
Malcolm W. Fraser
ATTORNEY

3,189,076
SHEET METAL CAGE NUT
James E. Adams, Toledo, Ohio, assignor, by mesne assignments, to The Bishop and Babcock Corporation, Toledo, Ohio, a corporation of Ohio
Filed May 22, 1962, Ser. No. 196,711
1 Claim. (Cl. 151—41.75)

This invention relates to fasteners but particularly to cage nuts which are adapted to be mounted on a supporting panel, and an object is to produce a cage nut which may be formed of sheet metal, and constitutes a nut part for reception of a screw and a mounting or attaching part to which the nut is secured in a novel manner and which has hook-like members for mounting in a panel aperture.

Another object is to produce a cage nut which is simple in construction, economical to manufacture, easy to assemble, and convenient to mount in a panel aperture.

Other objects and advantages of the invention will hereinafter appear and, for purposes of illustration but not of limitation, an embodiment of the invention is shown on the accompanying drawing in which FIGURE 1 is an exploded perspective view of the parts forming the cage nut and a fragment of a panel to which the cage nut is applied;

Figure 3:
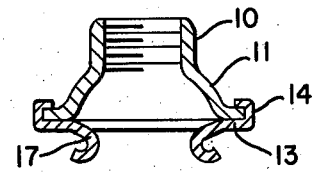
FIGURE 3 is a transverse sectional view substantially on the line 3—3 of FIGURE 2.
Figure 1:
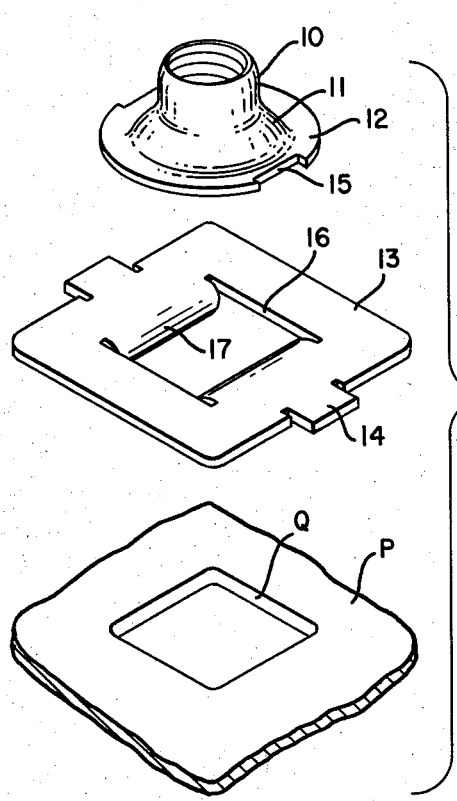

The illustrated embodiment of the invention comprises an extruded sheet metal nut 10, which is screw threaded on the inside and is formed with a downwardly and outwardly flaring skirt 11, the lower edge of which is integral with a flat radially extending circular base flange 12. This part is secured to a flat sheet metal mounting plate 13, which in this instance is oblong in shape. At opposite sides of the plate 13 are tabs 14, which are bent over the flat base flange 12 of the nut. For this purpose a pair of notches 15 are formed in opposite edges of the base flange to receive the tabs 14. In this manner the nut and mounting parts are secured together against relative rotation by bent over tabs 14 engaging in the notches 15.

A pair of parallel slits 16 are formed in the mounting plate 13, one being on each side of the tabs 14 and the portion therebetween after being severed centrally are formed into downwardly and outwardly, oppositely extending, curled hook members 17, particularly as indicated on FIGURE 3. The hook members 17 are carried by arms which incline downwardly and inwardly as shown on FIGURE 3. The hook members 17 engage the edge portions of a rectangular opening O formed in the supporting panel P.

The attachment of the cage nut to the supporting panel is effected by first hooking one of the hook members 17 against an edge of the opening Q and then forcing the other hook member 17 downwardly, the curved contour of the hook member enabling a cam action to take place so that it snaps into engagement with the adjacent edge of the hole or opening Q.

Figure 4:
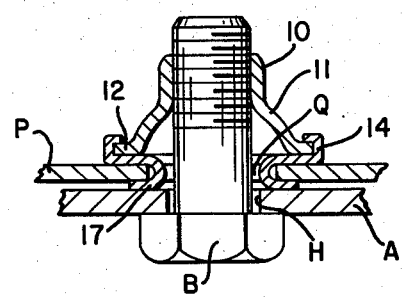
FIGURE 4 is a vertical sectional view of the fastener applied to a supporting panel with which is associated an attaching panel, a bolt securing these parts together and engaging the cage nut.
Figure 2:
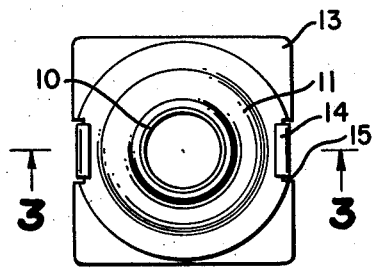
FIGURE 2 is a top plan view of the assembled cage nut.

FIGURE 4 illustrates the assembly with an attaching panel A to the supporting panel P. The attaching panel A has a hole H through which a bolt B extends to threadedly engage the nut 10. By tightening the bolt B so that its head presses the attaching panel A against the hook member 17, thereby flattening the end portions of the hook members between the panels P and A. This enables the attaching panel A to be brought into close juxtaposition to the under side of the supporting panel P.

From the above it will be manifest that I have produced an extremely simple and inexpensive cage nut, consisting of two pieces of sheet metal which are secured together together by tabs 14 bent over and engaging the nut member in such way that relative rotation between the two parts is prevented. The hook members 17 can be readily applied to engage the edge of the hole Q, in the supporting panel P and after attaching panel A has been drawn up tightly by means of the bolt B, the hook members are flattened out, thereby to reduce the space required between the two panels. The space required is merely that of the thickness of the sheet metal forming the hook members 17.

Numerous changes in details of construction, arrangement and choice of materials may be effected without departing from the spirit of the invention, especially as defined in the appended claim.

What I claim is:

A cage nut comprising a nut part having a flat sheet metal radially extending base flange and a centrally disposed outwardly extruded internally screw threaded tubular nut element formed with a downwardly and outwardly flaring skirt, the lower edge of which is integral with said flange, at least one notch in the edge portion of said flat base flange, a mounting part having a sheet metal plate, against which said base flange flatly abuts, tab means bent upwardly into said notch and then laterally inward into flatwise engagement with the outer face of said sheet metal base flange, thereby to hold the nut and mounting parts against relative turning movements, the bend of said tab means being substantially flush with the adjacent edge portions of said sheet metal plate, said sheet metal plate having laterally spaced slits and the portion between such slits being severed centrally and downward and outward and upward curved attaching hooks formed therefrom for engagement in a supporting panel aperture by first hooking one hook against an edge of the panel aperture and then forcing the other hook downwardly, the curved contour of the hook enabling a cam action to take place to effect snap engagement with the adjacent edge of such aperture, and the space between said hooks being substantially aligned with said nut element for the reception of a screw threaded shank, whereby said hooks are adapted for subsequent flattening between a surface of a supporting panel and a supported panel when said nut element supporting panel and supported panel are drawn together by screw action.

References Cited by the Examiner
UNITED STATES PATENTS

| | | | |
|---|---|---|---|
| 2,376,167 | 5/45 | Mitchell | 151—41.75 |
| 2,567,902 | 9/51 | Bedford | 151—41.75 |
| 2,605,806 | 8/52 | Tinnerman | 151—41.75 |
| 3,035,624 | 5/62 | Jaworski | 151—41.75 |
| 3,061,338 | 10/62 | Clark | 151—41.73 |

EDWARD C. ALLEN, *Primary Examiner.*